United States Patent [19]
Grams

[11] 3,918,477
[45] Nov. 11, 1975

[54] BACKFLOW PREVENTING DEVICE

[75] Inventor: Guenter A. Grams, Costa Mesa, Calif.

[73] Assignee: Surgical Mechanical Research, Inc., Newport Beach, Calif.

[22] Filed: Sept. 3, 1974

[21] Appl. No.: 502,792

[52] U.S. Cl. ............... 137/218; 251/333; 137/242
[51] Int. Cl.² ......................................... F16K 24/02
[58] Field of Search ........... 137/217, 218, 238, 242, 137/244, 513.5; 251/351, 333

[56]  References Cited
UNITED STATES PATENTS

| | | | |
|---|---|---|---|
| 2,252,164 | 8/1941 | Cantor | 137/218 |
| 2,655,171 | 10/1953 | Cantor | 137/218 |
| 2,784,732 | 3/1957 | Nurkienicz | 137/244 |
| 2,791,236 | 5/1957 | Mauer | 251/351 X |
| 2,804,279 | 8/1957 | Gould | 251/351 |
| 2,850,034 | 9/1958 | Svabek et al. | 137/218 |
| 3,286,722 | 11/1966 | Royer | 137/218 |
| 3,416,556 | 12/1968 | Nelson | 137/218 |
| 3,550,614 | 12/1970 | Englund et al. | 137/513.5 X |
| 3,736,951 | 6/1973 | Purtell | 137/217 |
| 3,818,929 | 6/1974 | Braukmann | 137/218 |

*Primary Examiner*—Henry T. Klinksiek
*Attorney, Agent, or Firm*—Lyon & Lyon

[57] ABSTRACT

A backflow preventing device having an inlet port, an outlet port and a vacuum breaker port, the vacuum breaker port having an annular valve seat engaged by a valve element having a radially inner seal ring, and a radially outer compression ring of greater height than the inner ring and having a vent opening, the rings being joined by a web and formed of elastomeric material whereby, on application of a force urging the inner ring into sealing engagement with the valve seat, the outer ring is axially compressed as well as radially deflected to exert an opposing force tending to disengage the inner ring from its valve seat and to produce a wiping action on the confronting seat so as to insure against sticking.

6 Claims, 8 Drawing Figures

BACKFLOW PREVENTING DEVICE

BACKGROUND OF THE INVENTION

In many areas it is required that the vent valve element which closes the vent port during normal water flow through backflow preventing devices can be provided with a metal spring exerting a back force tending to open the vent valve element when the internal pressure approaches atmospheric pressure; that is, an internal pressure in the order of one pound above atmospheric pressure in order to insure that the vent valve element will permit the low residual pressure to vent to atmosphere.

The use of such springs causes conventional backflow preventing devices to discharge or "spit" some water from the vacuum breaker. This occurance is often a nuisance; in such cases it is not uncommon for the valve to be tampered by removing the spring with the result that the backflow preventing device fails to meet code requirement.

SUMMARY OF THE INVENTION

The present invention is directed to a pressure type backflow preventing device which overcomes the disadvantages indicated, and is summarized in the following objects:

First, to provide a pressure type backflow preventing device wherein the usual metal back force spring is eliminated, and in place thereof is substituted a back force exerting element of elastomeric material formed integrally with the vent valve element.

Second, to provide in a backflow preventing device as indicated in the preceding object wherein the back force exerting element is provided with a bleed notch permitting the residual internal pressure to drop to atmospheric pressure, the back force exerting ring forming a guard or baffle to minimize discharge of water during lowering of the internal pressure to atmospheric pressure.

Third, to provide a back force exerting element as indicated in the preceeding objects wherein the back force exerting element and the surface engaged thereby are formed of materials having mutual lubricity and the back force exerting element is caused to deflect as the vent valve element finally approaches and initially receeds from its valve seat to produce a wiping movement, further minimizing the chance of any bonding action.

Fourth, to provide a pressure type backflow preventing device which incorporates novelly arranged compact test cocks controlling test ports disposed upstream and downstream of the inlet port, which are readily manipulated for purpose of testing the vacuum breaker and are adapted to receive test gauges or the like.

Fifth, to provide a backflow preventing device as indicated in the other objects wherein any or all of the parts except the housing connected to the line may, if required, be removed for repair, test or inspection.

Figure 1:
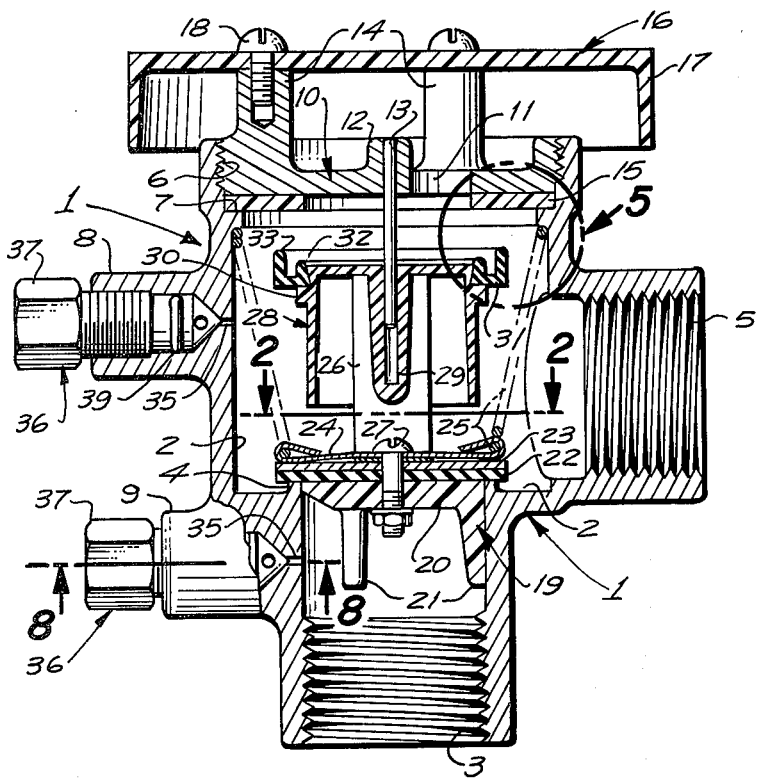
FIG. 1 is a sectional view of the pressure type backflow preventing device.
Figure 2:
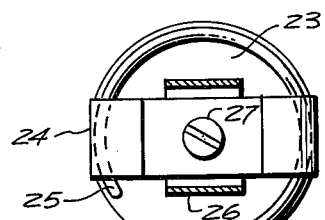
FIG. 2 is a sectional taken through 2—2 of FIG. 1 showing the inlet valve and the retainer and spacer straps thereon.
Figure 8:
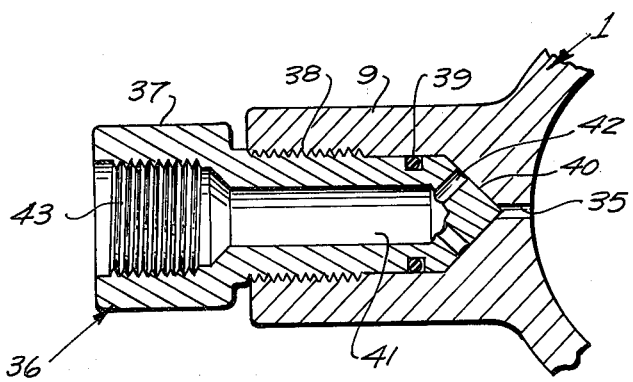
FIG. 8 is an enlarged fragmentary sectional view taken through 8—8 of FIG. 1 showing one of the test cocks.
Figure 3:
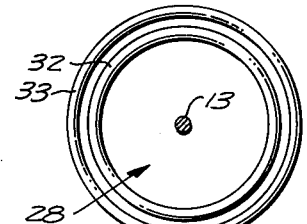
FIG. 3 is an end view of the vent valve.
Figure 4:
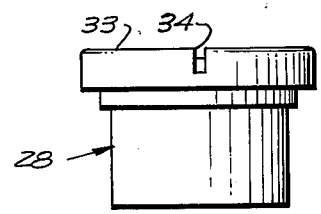
FIG. 4 is a side view thereof.

The pressure type backflow preventing device includes a valve body 1 forming an essentially cylindrical valve chamber 2 having an axially directed inlet port 3. The axially inner end of the inlet port 3 is provided with an inlet valve seat 4. An outlet port 5 extends radially from the valve chamber 2.

Disposed in axial alignment with the inlet port 3, is an access opening 6 which is internally screwthreaded and provided with an internal shoulder 7.

Extending radially from the valve chamber 2 and from the inlet port 3 is a pair of test cock bosses 8 and 9.

The access opening 6 receives a vent disk 10 having vent ports 11. Centered in the vent disk 10, is a guide pin boss 12 in which is secured an axially directed guide pin 13. Projecting axially outward from the vent disk is a set of cover supporting bosses 14. Clamped between the vent disk 10 and the internal shoulder 7 is a vent valve seat 15 formed of plastic material having a high degree of lubricity. For example, the seat may be formed of a carbon tetrafluoride, also certain of the polyvinyl chlorides may be used.

The vent disk 10 supports a cover 16 having a marginal flange 17. The cover is secured by screws 18 extending into the supporting bosses 14.

An inlet valve 19 is provided which includes a valve backing disk 20 fitted in the inlet port 3 and provided with guide bosses 21. The backing disk 20 supports a valve disk 22 over which is placed a cover disk 23. Mounted on the cover disk is a spring retaining strap 24, the lateral sides of which are folded to secure one end of a spring 25, also mounted on the cover disk is a U-shaped spacer strap 26. A screw 27 secures the inlet valve and the straps as a unit.

Spaced from the inlet valve 19 by the spacer strap 26 is a valve supporting member 28 in the form of an inverted cup having a depending central guide boss 29 which receives the guide pin 13. Externally the supporting member 28 is provided with a backing flange 30.

Supported by the flange 30, is an annular web 31 from which extends a radially inner ring 32 which forms a vent valve 33 and a radially outer ring 33 which protrudes axially beyond the inner ring to form a yieldable thrust member. The radially outer ring is provided with a vent notch 34.

The annular web 31 and the rings 32 and 33 are integral and molded from elastomeric material selected to have high lubricity in its contact with the vent valve seat 15.

Figure 5:
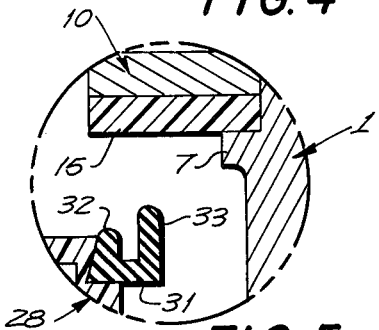
FIGS. 5, 6 and 7 are enlarged fragmentary sectional views showing particularly the vent valve and its seat in various relativel position, the section being taken within circle 5 of FIG. 1.

Operation of the pressure type backflow preventing device is as follows:

When the backflow preventing device is not in use, that is, under conditions of no pressure at the inlet or outlet port, the inlet valve 19 occupies a closed position and is yieldably held in such position by the spring 25, the upper end of which bears against the internal shoulder 7. In this condition, the spacer strap 26 supports the vent valve 32 and the trust member 33 in spaced relation to the vent valve seat 15 as shown both in FIG. 1 and FIG. 5.

Figure 7:
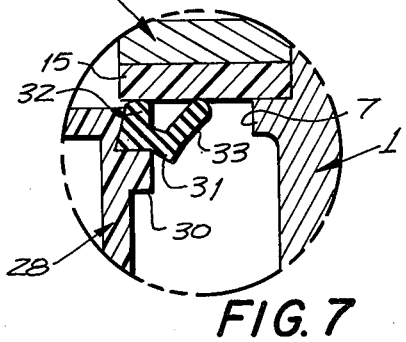

When the backflow preventing device is under normal operation, water pressure forces the inlet valve 19 open to the extent that the vent valve 32 engages the valve seat 15 as shown in FIG. 7. The thrust member 33 projects axially beyond the vent valve 32 so that as the vent valve approaches its seat, the web 31 is bent in the region between the rings 32 and 33 causing the ring or thrust member 33 to deflect radially outward. Thus, under normal conditions, water flows freely from the inlet port 3 through the valve chamber 2 and exists through the outlet port 5 while the vent valve 32 closes the vent ports and prevents the escape of water. This condition exists whether the flow line downstream of the outlet port is open or closed. If closed, water flow is of course, shut-off and the inlet valve 19 under force of the spring 25 returns to the valve seat 4, however, the pressure within the valve chamber maintains the vent valve 32 in its sealing position.

Figure 6:
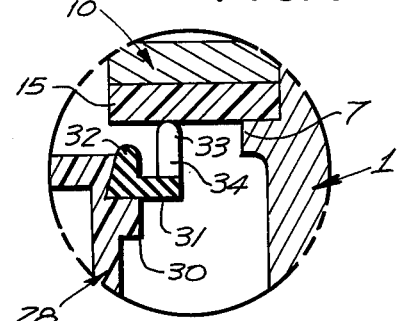

Should the pressure upstream of the inlet port 3 drop to or below atmospheric pressure, the inlet valve 19 will tend to remain closed. If under such conditions, the system downstream of the outlet port 5 to be open to atmosphere the pressure in the chamber too, will drop. As this pressure approaches atmospheric pressure, for example, in the order of 1 pound gauge pressure, the force stored in the thrust member 33 by reason of its deformation as shown in FIG. 7 will force the vent valve 42 from the vent valve seat 15. By reason of the vent notch 34, the residual pressure will continue to drop to atmospheric pressure. While some water will discharge through the vent notch 34 the remaining portion of the thrust ring prevents a free discharge of water and actually minimizes the total spillage discharge as a rate of discharge is slowed permitting separation of the air and water which may be contained in the system and thus favoring the discharge of air rather than water. Also when the system is turned on and water starts to flow through the vacuum breaker, the thrust ring minimizes or eliminates the discharge of water during the final closing movement of the vent valve 32, that is, during movement the position shown in FIG. 6 to the position shown in FIG. 7.

This is important for often valves of this type must be located where the spillage of water therefrom is undesirable. In previous valves of this type, it has been customary to utilize a spring disposed internally or externally of the vent valve. The use of such a spring has resulted in undesirable water discharge with the result that often, the spring or its equivalent is removed, and the spring is taken out, thus eliminating any means of forcing the vent valve from its seat other than by the creation of a vacuum within the valve chamber 2. As mentioned previously, removal of the spring would be a code violation. By constructing the vent valve 32 and a thrust member as a single piece one cannot be removed without the other.

It is often necessary to locate backflow preventing devices in systems wherein the backflow preventor must be inspected periodically to determine whether or not it is functioning properly. The backflow preventing device herein before described may be readily adapted for such inspection by provision of the test cock bosses 8 and 9. Each boss is provided with a bore, the outer portion of which is internally screwthreaded and the inner portion terminates in a conical seat and a small test port 35. Each bore receives a test cock 36 having a polygonal outer end portion 37 so that the cock may be turned by use of a wrench. The test cock includes an externally screwthreaded portion 38 and a groove which receives a seal ring 39. The inner end of the test cock forms a conical valve surface 40. Each test cock 36 is provided with a bore 41 terminating in side ports 42 penetrating the conical end 40. The outer portion of bore 41 is internally screwthreaded as indicated by 43.

Furthermore the construction of the backflow preventing device is so arranged that all parts, except the housing 1 may be removed for inspection, repair or test without removing the housing 1 from the line.

Operation of the test cock is as follows:

Normally, the test cock is tightened in the boss so that the test port 35 is sealed. When it is desired to make a test, the test port 35 is opened by turning the test cock. First, however, a pressure measuring implement such as a pressure gauge or a manometer is connected to the test cock.

Having fully described my invention it is to be understood that I am not to be limited to the details herein set forth, but that my invention is of the full scope of the appended claims.

I claim:

1. A backflow preventing device, comprising:
    a. a housing structure defining a valve chamber having an inlet port, an outlet port, and an access opening;
    b. an inlet valve for the inlet port;
    c. a vent disk fitting the access opening and having a vent opening;
    d. a vent valve for closing the vent opening in response to positive pressure in the valve chamber;
    e. means connecting the inlet valve and vent valve for movement in unison during closure of the vent valve;
    f. and ported yieldable means integral with the vent valve, for removal and replacement as a unit therewith, projecting axially therebeyond for engaging the vent disk during closing and opening the vent valve to permit reduced flow across the vent valve immediately prior to seating of the vent valve and immediately subsequent to opening of the vent valve.

2. A backflow preventing device as defined in claim 1, wherein:
    a. the yieldable means is a ring disposed in radial relation to the vent valve and having at least one notch forming said port to avoid sealing contact with the vent disk and provide said reduced flow.
    b. a vent valve ring supported on the disk for sealingly engaging said peripheral seat upon opening of the inlet valve;
    c. and a thrust element integral with the vent valve ring for removal or replacement therewith as a unit, the thrust element projecting axially beyond the vent valve ring and including a restricted means for nonsealing engageable with the housing structure in the vicinity of the vent opening for limited flow through the vent opening, the thrust element being yieldable to a predetermined positive pressure in the valve chamber to permit closure of the vent opening by the vent valve ring.

3. A backflow preventing device as defined in claim 1, wherein:

a. the yieldable means includes a ring essentially concentric with respect to the vent valve and a web joining the vent valve and ring, the web and ring being distortable to produce a wiping movement with respect to the vent disk during final approach and initial recession of the vent valve with respect to the vent disk.

4. The combination with a backflow preventing device including a housing structure defining a valve chamber having an inlet port, outlet port and a vent opening provided with a peripheral seat, an inlet valve for the inlet port, of a vent valve means comprising:
   a. a supporting disk connected to the inlet valve for movement in unison therewith;

5. A vent valve means as defined in claim 4, wherein:
   a. the yieldable thrust element is a ring disposed in radial relation to the vent valve ring and said restricted means is a notch to effect non-sealing engagement therewith.

6. A vent valve means as defined in claim 4, wherein:
   a. the yieldable thrust element is a ring surrounding the vent valve ring and is joined thereto by a yieldable web, the web being angularly flexible to cause radial expansion and contraction of the thrust element as the vent valve ring approaches toward or receeds from sealing contact with said peripheral seat to produce a wiping contact with a wall of the valve chamber.

* * * * *